UNITED STATES PATENT OFFICE.

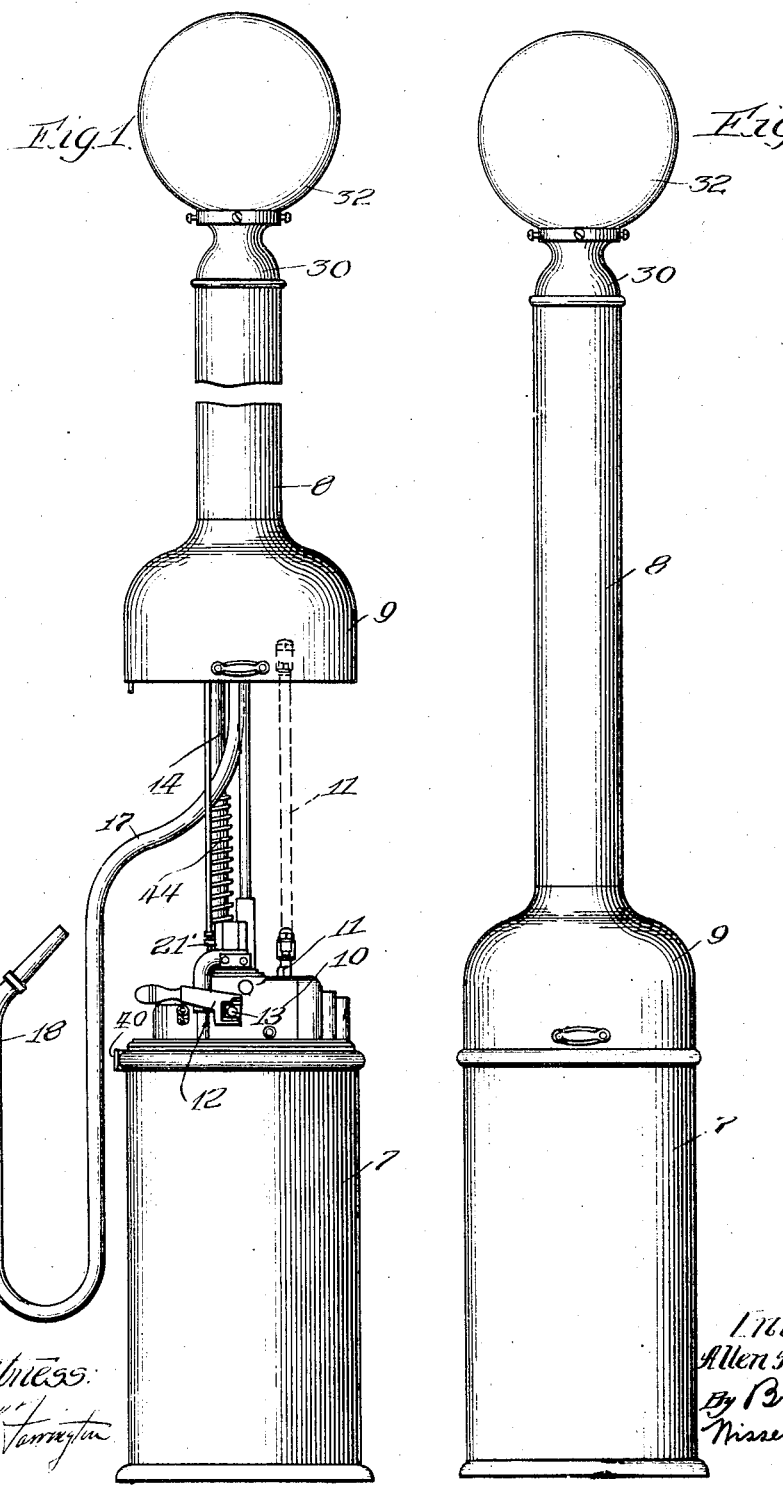

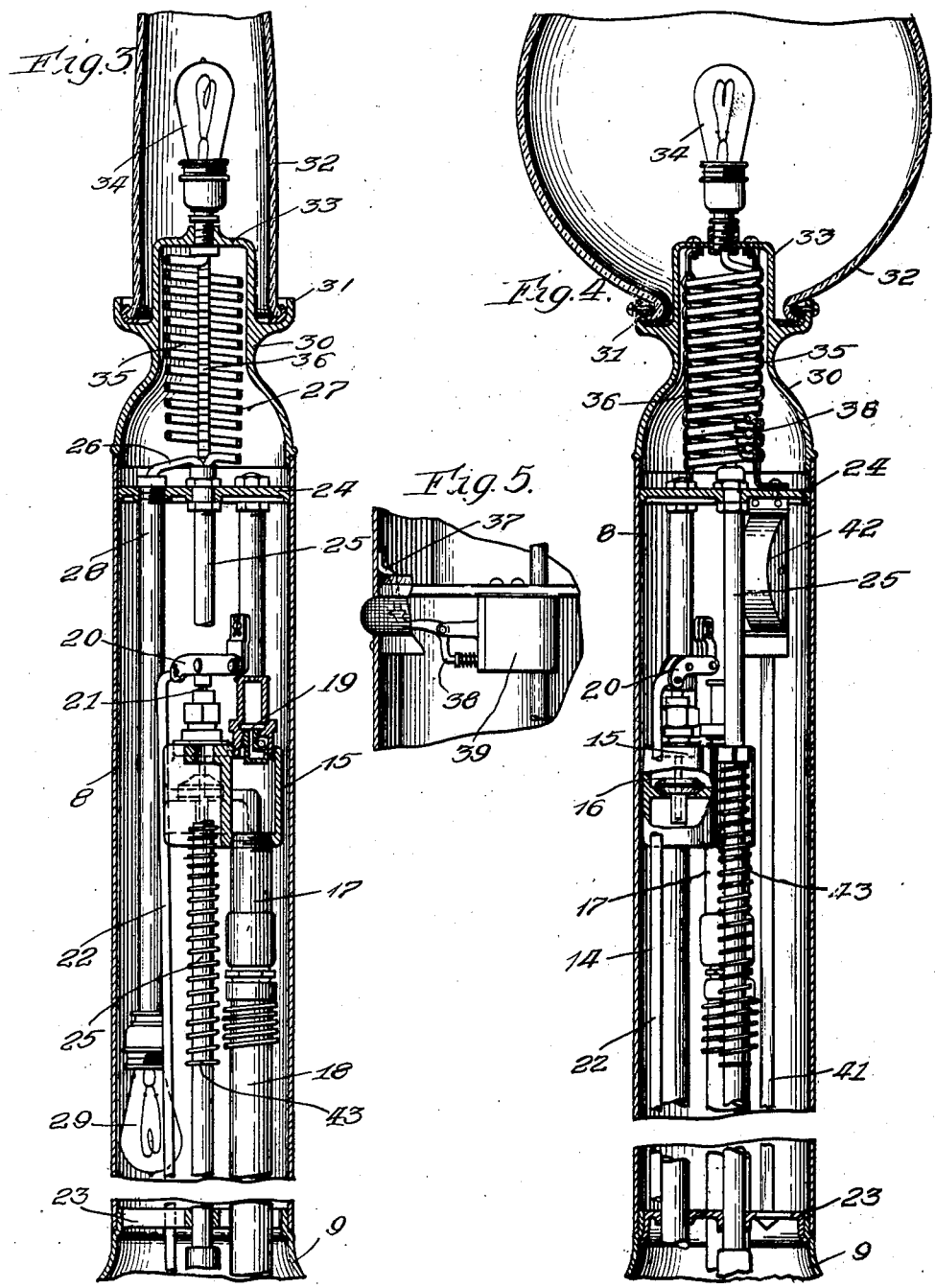

ALLEN A. BOWSER, OF FORT WAYNE, INDIANA.

INCLOSING CASING.

1,306,743.　　　　　　　Specification of Letters Patent.　　Patented June 17, 1919.

Original application filed October 15, 1914, Serial No. 866,759. Divided and this application filed March 31, 1916. Serial No. 87,995.

*To all whom it may concern:*

Be it known that I, ALLEN A. BOWSER, a citizen of the United States, residing at Fort Wayne, in the county of Allen and State of Indiana, have invented certain new and useful Improvements in Inclosing Casings, of which the following is a specification.

This invention relates to a casing for inclosing any operative mechanism which is opened to render accessible the mechanism which it incloses. The principal object of the invention is, therefore, to provide an improved construction, combination and arrangement of parts by which an operative mechanism may be completely inclosed, for shielding the parts which it incloses from the weather and for preventing tampering therewith by an unauthorized person. Other objects will appear hereinafter.

In the accompanying drawings, Figure 1 is a side elevation of a liquid dispensing apparatus provided with a casing constructed in accordance with the principles of my invention, with one portion of the casing raised to disclose the dispensing apparatus; Fig. 2 is a side elevation of a casing in closed position; Fig. 3 is a sectional view of the upper portion of the casing; Fig. 4 is another sectional view of the upper portion of the casing, and Fig. 5 is a detail of the locking mechanism for the fixed and separable parts of the casing.

Although the present invention may be used for any apparatus to which it is applicable it is particularly designed and intended for use in connection with liquid dispensing apparatus, and as such the application is a division from the applicant's co-pending application for dispensing apparatus, Serial No. 866,759, filed in the U. S. Patent Office October 15, 1914.

It is necessary to inclose and protect many parts of apparatus which otherwise would be open to the weather and exposed for operation by unauthorized persons, but it is particularly desirable to protect liquid dispensing apparatus which discharges gasolene, oil and the like. Furthermore, the development of the automobile business has rendered it necessary to place oil dispensing apparatus adjacent the streets or roads where they are accessible. The insurance underwriters also demand a fire-proof structure, and in cities the building requirements prevent the erection of a structure which is not fire-proof for inclosing or dispensing gasolene and other oils, and also prevent the erection of inclosures adjacent the roads or streets sufficiently large that a person may enter them.

The present invention provides a structure which is secured to and forms an intimate inclosure of the dispensing apparatus which may be placed adjacent the road or street, or of course at any other convenient place, so that an automobile or any other vehicle may be filled therefrom, the casing when closed containing all the liquid dispensing elements so that the parts cannot be tampered with by an unauthorized person.

Referring more particularly to the drawings, the reference numeral 7 designates generally the lower portion of a casing which is generally fixed at the base and to the dispensing apparatus and an upper movable portion 8 formed with a lower hood 9 of substantially the same size as the lower portion of the casing, the upper portion being vertically movable so that by simply raising it the apparatus inclosed thereby is freely accessible.

The dispensing apparatus shown in the present embodiment of the invention comprises a pump of which the top thereof is designated by the reference numeral 10 (in Fig. 1) having a vertically movable rack 11 and an operating crank 12 which is pivotally mounted at 13 and foldable within the hood 9 of the casing when it is closed. Extending upwardly from the pump is a pipe 14 which communicates with a header 15 (shown in Figs. 3 and 4) in which is an upwardly opening valve 16 to admit liquid to the header, with a downwardly extending discharge pipe 17 also in connection with the header and having a fixed hose 18 at the lower end of sufficient length to extend a considerable distance away from the apparatus but adapted to be contained in the casing when it is closed. At the top of the header 15 is an air inlet valve 19 which allows the hose to drain from the header thereby preventing any considerable head of liquid in the discharge hose. A valve-operating lever 20 is pivoted above the header 15 and has a stem 21 which may be moved to hold valve 16 on its seat, with a link 22 for connecting the lever 20 with an operating lever 21' adjacent the crank 12.

In order to support and guide the upper portion of the casing 8 a perforated plate 23 is secured thereto just above the hood 9 through which extend rigid pipes and members for supporting an upper fixed plate 24 which is free from engagement with the upper portion of the casing. One of the supporting members for this fixed plate 24 is a conduit 25 for containing electrical conductors 26, 27, one of which extends to another conduit 28 depending from the fixed plate 24 with an electric lamp 29 at the lower end thereof sufficiently above the lower plate 23 so that when the movable portion of the casing is raised to its uppermost position the lamp 29 will be just above the plate 23 so that light will shine through apertures of the plate disclosing all the apparatus covered by the hood 9.

At the upper end of the movable portion 8 is a member 30 having a seat 31 for supporting a globe 32 and with an inner support 33 for a lamp 34. The conductors 27 are connected with this lamp 34 by means of a coil 35 upheld by looped straps 36 so that as the upper portion of the casing is raised the coil 35 will be extended, the straps preventing the dislocation and entanglement of the coils and holding them in place.

This casing itself is distinctive in appearance and serves as a signal for the liquid which is dispensed thereby, the lamp at the top being a further signal for use at night and the other lamp 29 serves to illuminate the apparatus inclosed by the casing so that it can be readily used at night. It is preferable to provide means for automatically lighting and extinguishing this light 29, and for that purpose an extension 37 may be provided on one portion of the casing which engages an operating lever 38 of an electric switch 39 which opens and closes the circuit for the lamp 29 when the casing is closed and opened respectively. A lock 40 (see Fig. 1) is commonly provided for holding the portions of the casing together in closed position.

In order that the movable portion of the casing may be raised and lowered with the greatest ease a counterweight or any other suitable means may be provided. As clearly shown in Fig. 4, one end of a strip 41 is attached to the lower plate 23 fixed to the upper portion 8 of the casing, and a spring casing 42 is attached to the upper plate 24 which tends to wind up the spring or strip 41 in a well known manner. This spring is of sufficient strength to substantially counterbalance the weight of the upper portion 8 and its connected parts so that when this portion of the casing is raised to its uppermost position it will be held in place by the spring.

One of the supporting members for the plate 24 is provided with a spring 43 which is engaged by the plate 23 when the upper portion of the casing is raised so that the stopping of this portion of the casing will be cushioned by the spring. A buffer spring 44 is also provided for engaging the lower plate 23 upon the downward movement of the casing 8.

With this construction it is obvious that in order to completely uncover and render operative all the mechanism inclosed by the casing it is only necessary to raise the upper portion of the casing which is substantially counterbalanced so that it is easily raised or lowered, and the closure of the casing renders inaccessible all of the parts within so that by locking it they cannot be tampered with. When the upper portion of the casing is raised it is held in place by the plates 23 and 24 so that it can be easily closed without any attention or the necessity of seeing that the parts register for they are so held in place that they cannot get out of register. The mechanism within the casing is accessible from all sides when the casing is raised.

What I claim is:

1. The combination with manually operable mechanism to be inclosed, of a lower fixed inclosing casing above which some of the mechanism extends, a support extending above the mechanism and a hood carried by and inclosing the support and movable upon it from a juncture with the lower casing to an upper position where the mechanism is uncovered for manual operation.

2. The combination of a horizontally divisible casing, the upper portion of which is movable, of a support for the upper portion inclosed thereby, and resilient means between the support and a lower point of the movable portion of the casing to partially counterbalance it.

3. The combination with mechanism to be inclosed, of a support extending above the mechanism, a hood inclosing the support and movable to cover the mechanism, and a counterbalance connected from the support to a lower point of the hood whereby the hood may be readily raised for rendering accessible the inclosed mechanism.

4. The combination with mechanism to be inclosed, of a support extending above the mechanism, a hood with a flared lower portion to cover the mechanism and another portion to cover the support, and a counterbalance connected to the upper portion of the support and to a lower point on the hood for counterbalancing the hood to assist in raising it.

5. The combination with a horizontally divisible casing the upper portion of which is movable, of a support comprising a plate fitting within the movable portion of the casing with respect to which the casing is movable, and another plate secured to the casing below the other support having perforations through which the said supports pass freely, the plates acting as guides for limiting the vertical movement of the upper portion of the casing.

6. The combination with a horizontally divisible inclosing casing the upper portion of which is movable, of an electric lamp carried by the movable portion for illuminating any apparatus in the lower portion of the casing, and an electric switch for controlling the lamp which is opened when the movable portion of the casing is closed and which is closed when the casing is opened.

In testimony whereof I have signed my name to this specification, in the presence of two subscribing witnesses, on this 28 day of March, A. D. 1916.

ALLEN A. BOWSER.

Witnesses:
J. R. MATLACK,
A. L. FISHER.